United States Patent
Hajdukiewicz et al.

(10) Patent No.: US 7,055,367 B2
(45) Date of Patent: Jun. 6, 2006

(54) CALIBRATION OF A PROBE

(75) Inventors: Peter Hajdukiewicz, Gloucestershire (GB); Geoffrey McFarland, Gloucestershire (GB); David Sven Wallace, Gloucestershire (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/493,143

(22) PCT Filed: Nov. 1, 2002

(86) PCT No.: PCT/GB02/04936

§ 371 (c)(1),
(2), (4) Date: Apr. 20, 2004

(87) PCT Pub. No.: WO03/038375

PCT Pub. Date: May 8, 2003

(65) Prior Publication Data

US 2004/0244464 A1     Dec. 9, 2004

(30) Foreign Application Priority Data

Nov. 1, 2001     (GB)     .................. 0126232.8

(51) Int. Cl.
*G01B 5/004*     (2006.01)
*G01B 5/008*     (2006.01)
*G12B 13/00*     (2006.01)
*G01C 25/00*     (2006.01)

(52) U.S. Cl. .................. 73/1.79; 73/1.81; 33/501.02; 33/501.04; 33/503; 33/504; 702/94; 702/95; 702/104; 702/150; 702/155; 702/157

(58) Field of Classification Search .................. 73/1.75, 73/1.79, 1.81; 33/1 BB, 1 M, 501.01–502.04, 33/503, 504, 556, 559; 702/81, 85–88, 94, 702/95, 104, 150–153, 155–158, 166–168
See application file for complete search history.

(56) References Cited

U.S. PATENT DOCUMENTS 4,369,581 A * 1/1983 Lenz ........................ 33/1 M (Continued)

FOREIGN PATENT DOCUMENTS

| DE | 198 09 589 A 1 | 9/1999 |
|----|----------------|--------|
| EP | 0 599 513 A 1 | 6/1994 |
| GB | 1 551 218 | 8/1979 |
| WO | WO 00/25087 | 5/2000 |
| WO | WO 00/62015 | 10/2000 |

OTHER PUBLICATIONS

Caskey et al., "Results of the NIST National Ball Plate Round Robin", Journal of Research of the National Institute of Standards and Technology, Jan.-Feb. 1997, vol. 102, No. 1, pp. 85-93.*

*Primary Examiner*—Hezron Williams
*Assistant Examiner*—David A. Rogers
(74) *Attorney, Agent, or Firm*—Oliff & Berridge, PLC

(57) ABSTRACT

A method of calibrating an analogue probe (10) having a stylus (12) with a workpiece-contacting tip (14) or a non-contact probe (26). A calibration artefact such as a calibration sphere (16) is mounted on a coordinate measuring machine (CMM) (18). The probe (10,26) is mounted on an arm (8) of the CMM and the probe is moved along a path whilst continually scanning the surface of the calibration artefact such that the probe is exercised throughout its working range. For an analogue probe (10) having a workpiece-contacting stylus (12), the path is such that the deflection of the stylus varies along the path. For a non-contact probe (26) the path is such that there is variation of the radial distance between the path and the calibration artefact. The probe path may comprise a path parallel to a chord of the calibration sphere or a curved, e.g. a sinusoidal, path.

7 Claims, 6 Drawing Sheets

U.S. PATENT DOCUMENTS

| | | | |
|---|---|---|---|
| 4,437,151 A * | 3/1984 | Hurt et al. ..................... 702/95 |
| 4,523,450 A * | 6/1985 | Herzog ....................... 73/1.81 |
| 4,875,177 A * | 10/1989 | Jarman ........................ 702/95 |
| 4,945,501 A * | 7/1990 | Bell et al. ..................... 702/95 |
| 5,125,261 A * | 6/1992 | Powley ....................... 73/1.81 |
| 5,189,806 A * | 3/1993 | McMurtry et al. ............ 33/503 |
| 5,501,096 A | 3/1996 | Stettner et al. |
| 5,583,443 A * | 12/1996 | McMurtry et al. .......... 324/601 |
| 5,665,896 A * | 9/1997 | McMurtry .................. 73/1.75 |
| 5,687,293 A * | 11/1997 | Snell .......................... 700/254 |
| 6,434,846 B1 * | 8/2002 | McMurtry et al. ............ 33/502 |
| 6,580,964 B1 * | 6/2003 | Sutherland et al. ......... 700/193 |
| 6,591,208 B1 * | 7/2003 | Lotze et al. .................. 702/95 |

\* cited by examiner

CALIBRATION OF A PROBE

The present invention relates to a method of calibrating probes. In particular, the invention relates to the calibration of analog probes having a deflectable stylus and non-contact probes.

Analog probes are well-known and an example of a probe is described in our UK Patent No. 1,551,218. This patent describes a probe suspension mechanism which comprises three orthogonally arranged pairs of parallel springs connected in series between a fixed point on the probe housing and a movable member to which the workpiece contacting stylus is connected. Although the term 'analog probe' is used, the outputs of the probe may be either analogue or digital. An analog probe may be mounted on a coordinate positioning machine for example a coordinate measuring machine, a machine tool or articulating measuring arm.

During a measuring operation on a workpiece using such a probe, a machine on which the probe is mounted is driven towards the workpiece to bring the stylus into contact with the workpiece. When the tip of the stylus contacts the workpiece the stylus will be deflected as the machine continues to move and measuring transducers within the probe generate outputs representing deflections of the probe stylus along three orthogonal axes. These axes are referred to as the a,b and c axes of the probe. The abc outputs representing stylus deflection are combined with the machine output XYZ representing the position of the probe to give a true indication of the stylus tip position and therefore information about the surface of the workpiece.

Ideally it would be arranged that the a,b and c axes of the probe are aligned with the X,Y and Z coordinate axes of the machine when the probe is mounted on the machine so that the measuring deflections of the probe stylus will take place along the X,Y and Z axes of the machine. However such alignment is not always possible to achieve.

In addition if there is misalignment between the probe a,b and c axes such that they are not orthogonal, then deflection of the stylus for example nominally in the a direction can give rise to deflections in the b and c directions also.

Furthermore the scaling factors of the three probe axes will in general deviate from their nominal values. In addition the sensors may give non-linear outputs.

Therefore it is usual to calibrate the probe and machine system to determine the effects of any such misalignment and scaling errors and thereafter to correct any measurements made on the workpiece for these effects.

Non-contact probes may also be used to scan the surface of a workpiece. These probes are positioned close to the surface of the workpiece without touching it. The probes detect the proximity of the surface using, for example, capacitance, inductance or optical means. Non-contact probes also require calibration. For example, there may be variation in measurement data obtained from a non-contact probe at different distances from a surface, which needs to be corrected.

One method of performing the calibration is to mount a calibration artifact on the machine for example a reference sphere of known diameter. The probe is driven towards the artifact, for example along one of the probe axes, until an increase in the output of the measuring devices of the probe above a predetermined threshold level indicate that contact with the surface of the artifact has been made. After stylus contact has been confirmed a set of machine coordinate data XYZ and probe coordinate data abc is taken. Machine movement continues until the machine has moved a selected distance beyond the confirmed contact point and a further set of XYZ and abc coordinate data is taken. The changes in the abc outputs of the probe's measuring transducers in the three axes are recorded and correlated with the changes in the readings of the machine's measurement devices along each of the three machine axes XYZ. This procedure is repeated for two other orthogonal directions which may be the other two machine axes. From these sets of readings a probe transformation matrix can be established which relates the probe outputs in the a,b and c axes to the machine's X,Y and Z coordinate system.

Once the transformation matrix has been established the relevant machine axis components of the probe deflections can be obtained by multiplying the relevant probe output by the relevant matrix term.

This method has the disadvantage that it produces a limited amount of probe data as the probe is moved in a limited number of directions.

German patent application 19809589 discloses a method of calibrating a sensor of an electronically controlled coordinate measuring device using a calibration body. Parts of the calibration body are sensed continuously be the sensor along a line, the line not being limited to one plane. The sensor may be subjected to differing application pressures while taking readings along the line to verify the exact effect of the application pressure on the calibration test results. This method is suitable for an 'active probe' in which a motorised mechanism is used to modulate the contact force between the stylus and component to be measured. However, this method is not suitable for a 'passive probe' in which during the measurement of a component, contact force between the component and the stylus is generated by mechanical springs and the force is proportional to stylus deflection. The deflection sensor outputs over this stylus deflection range may have scaling errors and be non-linear. Likewise, the above method is not suitable for use with non-contact probes.

A first aspect of the present invention provides a method of calibrating a probe comprising the steps of:

mounting a calibration artifact on a first part of a coordinate positioning machine;

mounting the probe on a second part of the coordinate positioning machine, said second part being movable with respect to said first part;

moving the probe along one or more scan paths around the calibration artifact whilst continually scanning the surface of the calibration artifact such that the probe is exercised through its working range;

and using measurement data from the probe and the coordinate positioning machine to determine the calibration coefficients of the probe.

The probe may comprise an analog probe having a stylus with a workpiece-contacting tip and wherein the path of the probe is such that the amount of deflection of the stylus varies along the path.

Alternatively, the probe may comprise a non-contact probe, wherein the path of the probe is such that the distance between the probe and the calibration artifact varies along said path.

The calibration artifact may comprise a sphere and at least part of the path of the probe may be parallel to a chord of the sphere. The path of the probe may comprise a sequence of lines parallel to a chord of the sphere. Alternatively the path of the probe could comprise a curved path, such as a sinusoidal path.

At least one scan path of the probe may be scanned at two or more different stylus deflections or two or more different radial distances between the scan path and the calibration artifact.

A second aspect of the present invention provides a computer program to operate the above method.

Preferred embodiments of the invention will now be described by way of example with reference to the accompanying drawings wherein.

Figure 1:
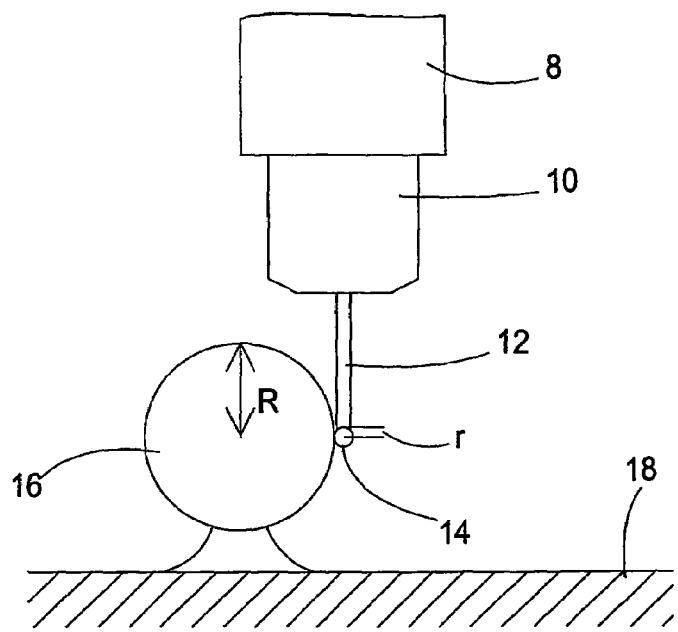
FIG. 1 illustrates an analog probe with its stylus in contact with a calibration sphere.

FIG. 1 shows an analog probe 10 which is mounted on a quill 8 of a coordinate measuring machine (CMM) (not shown). The analog probe has a stylus 12 with a workpiece-contacting tip 1. The workpiece-contacting tip may comprise a ball or other shape, such as a disc. When the stylus tip contacts a surface to be measured it produces a signal abc representing stylus deflection. As the probe is moved by the coordinate measuring machine a signal XYZ is produced which indicates the position of the probe. The stylus deflection signal abc is combined with the coordinate measuring machine reading XYZ to give a true indication of the stylus tip position and hence information about the workpiece. However, the probe must first be calibrated to ensure that the abc stylus position signals are scaled and aligned with the coordinate measuring machine XYZ position signals.

Figure 7:
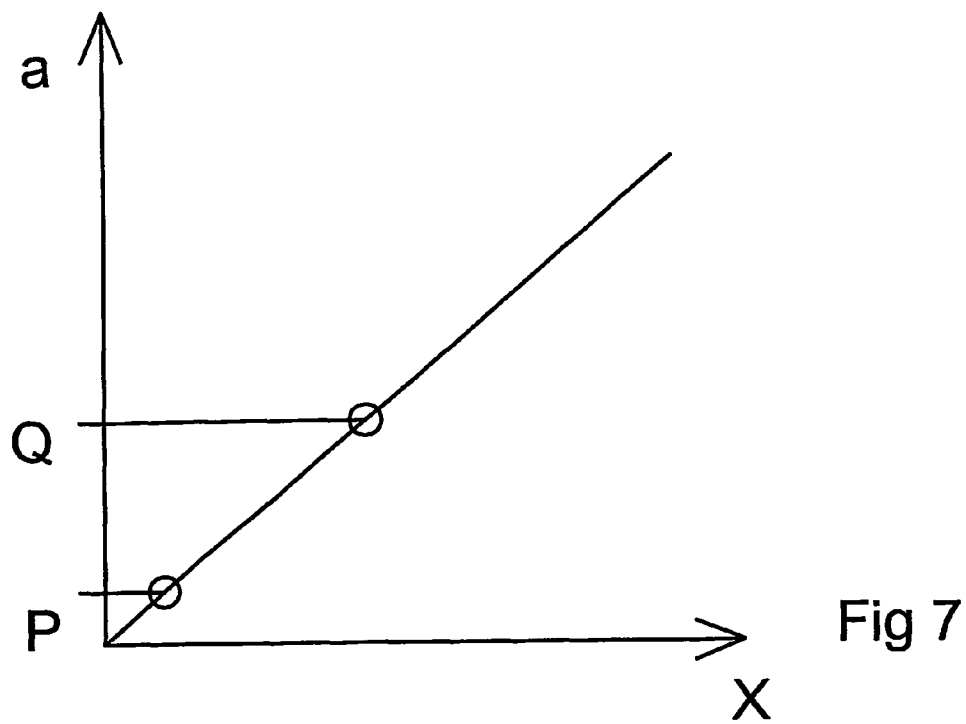
FIG. 7 illustrates the relationship between the "X" output of the CMM and the "a" output of the probe.

FIG. 7 illustrates the relationship between the 'X' output of the CMM and the 'a' output of the probe. Although this is shown to be a linear relationship in FIG. 7, it could equally be a non-linear, e.g., quadratic, relationship. The probe is used within a working range between lower and upper extremities P,Q of its probe output a. It is therefore desired to calibrate the probe within this working range (i.e., between P and Q on FIG. 7). FIG. 7 shows one dimension of the probe and CMM for clarity but it is desirable to calibrate the probe for all three dimensions in its working range. The combined a,b and c outputs of the probe are referred to as the radial deflection.

The calibration sphere 16 is attached to the machine table or bed 18. The calibration sphere has a known radius R. Firstly the center of the calibration sphere must be found. This may be done by setting the probe in touch trigger mode, in which it sends a signal to the coordinate measuring machine whenever the stylus is deflected. In this mode no calibration of the type the invention relates to is required. The probe is moved towards the sphere until the stylus tip contacts the sphere and the stylus is deflected causing a touch trigger event. The approximate position of this point on the surface of the calibration sphere can thus be determined. This step is repeated for a further three points. With the four known points on the surface of the calibration sphere, the known radius R of the calibration sphere and known stylus tip radius r, the center of the calibration sphere is calculated to a sufficient approximation to allow the calibration routine to run.

The probe is returned to the analog mode and the probe is moved towards the calibration sphere until the stylus tip is in contact with the calibration sphere and the stylus is deflected. The deflection of the stylus can be estimated if both the stylus tip diameter and the calibration sphere diameter are known. The stylus deflection is kept small compared with the required stylus deflection range to be calibrated.

Figure 2:
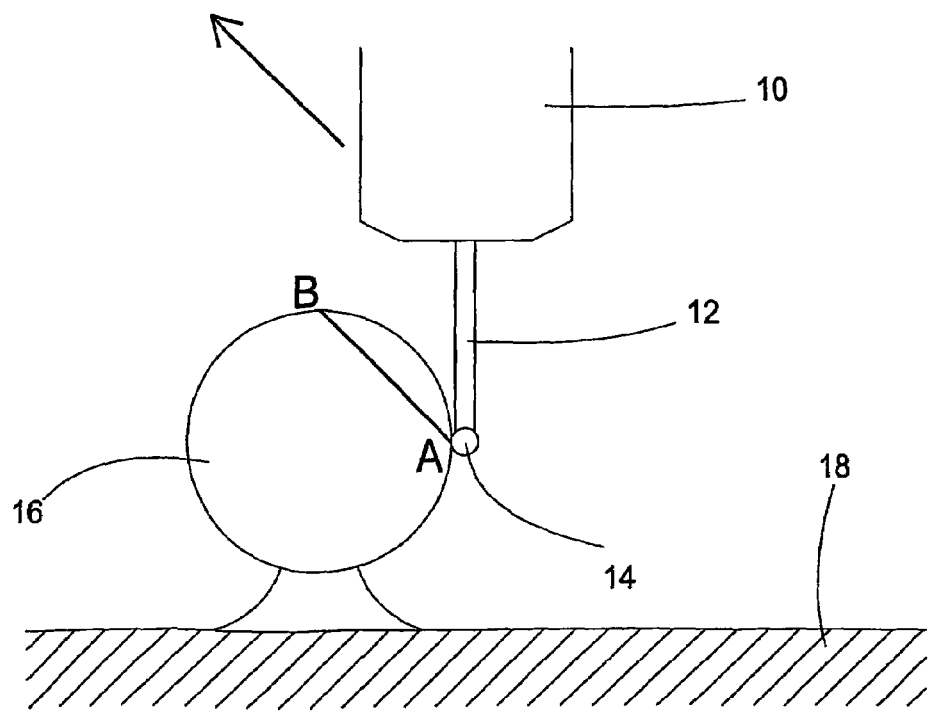
FIG. 2 illustrates the path of the probe with respect to the calibration sphere.

The coordinate measuring machine now moves the probe along a path such that the stylus tip moves from a first point of contact with the calibration sphere to a second point of contact with the calibration sphere while remaining in continuous contact. The probe is moved linearly, following a chord between the first and second points A,B of the calibration sphere as shown in FIG. 2. As the probe moves in the direction of the chord the stylus tip and stylus are deflected around the surface of the calibration sphere.

Figure 8:
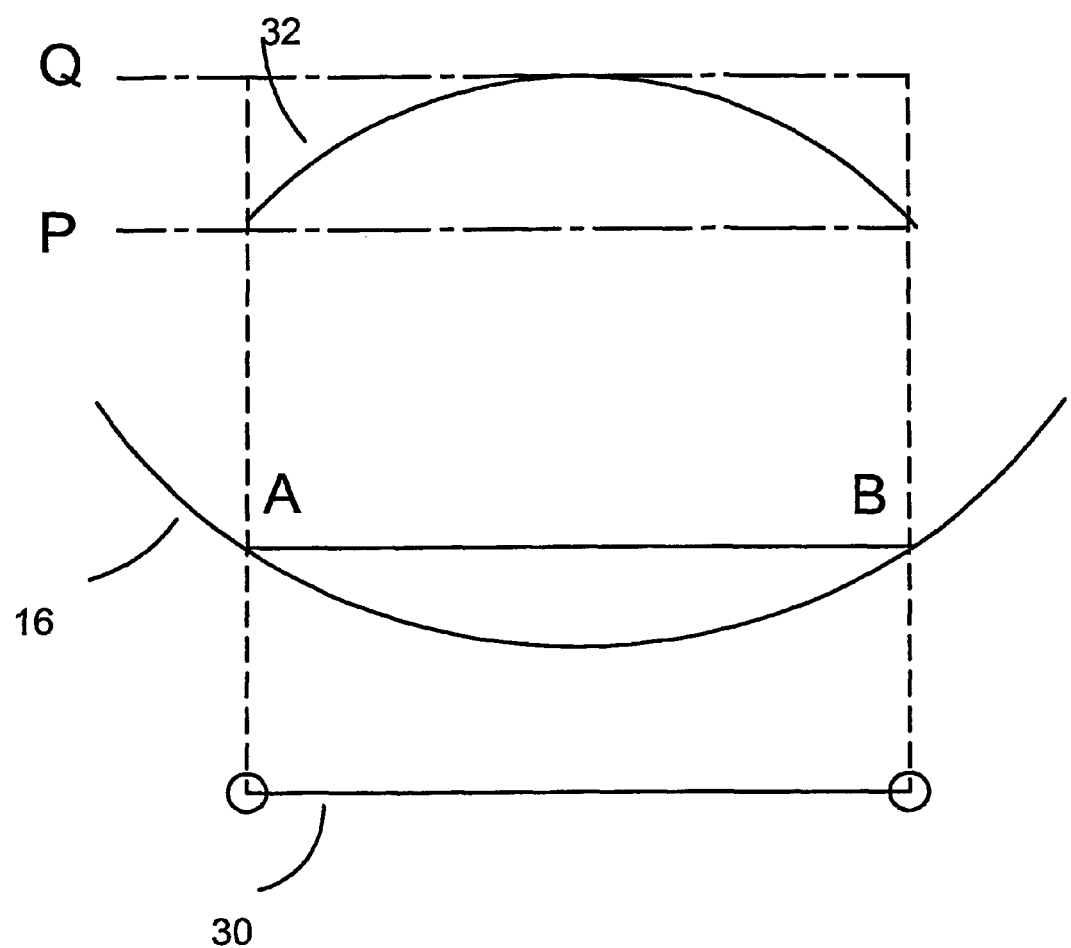
FIG. 8 illustrates the probe scan path about a calibration sphere and the corresponding radial reading of the probe.

FIG. 8 illustrates a portion of the calibration sphere 16. Line 30 shows the path of the probe parallel to a chord of the calibration sphere extending between points A and B. Line 32 illustrates the radial deflection of the probe corresponding to the position of the probe on its path 30. As the probe is moved along the path 30, the radial reading of the probe varies between P and Q which define the extremities of the working range of the probe. The chord length between A and B is calculated so that the probe deflects over the required calibration range.

Figure 3:
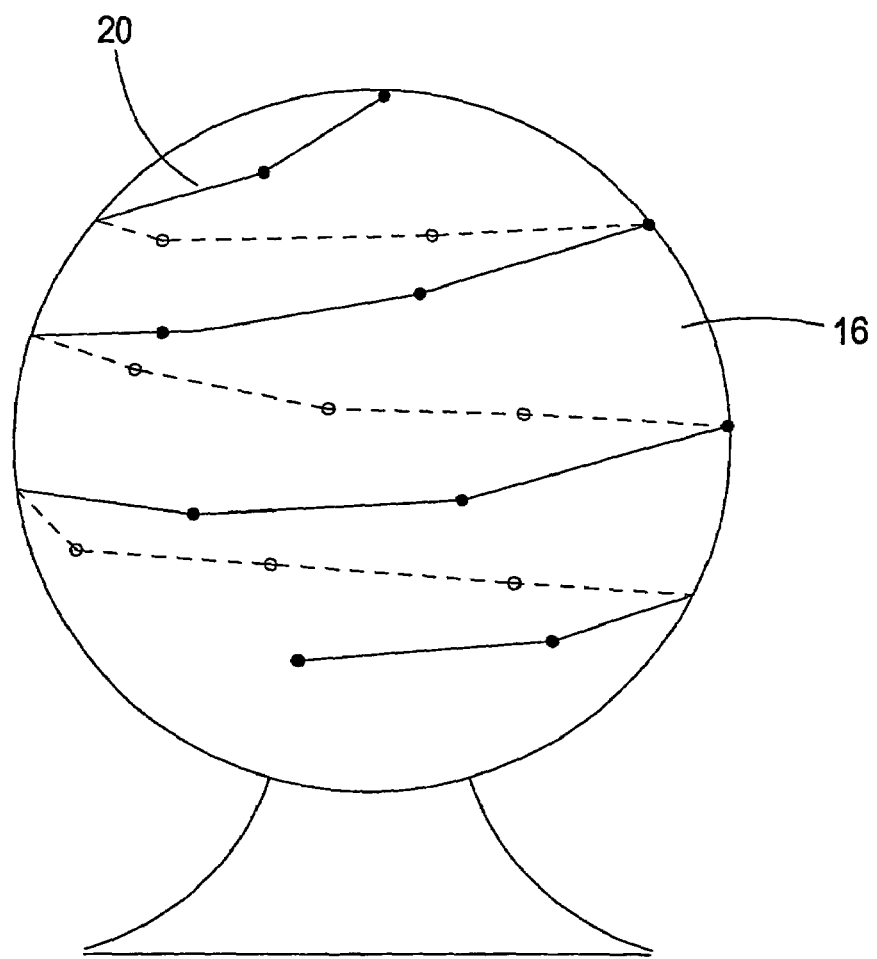
FIG. 3 shows the movement of the workpiece-contacting tip of the stylus on the calibration sphere.

The probe is driven by the coordinate measuring machine in a pattern of chordal movements around and down the calibration sphere and during these movements the stylus tip slips freely around the sphere. FIG. 3 shows a sequence of chordal movements 20 around the calibration sphere 16 forming a helical path.

The CMM may move the probe in a sequence of chordal movements comprising a set of circular rings or spirals. Reversing the direction of the probe during the sequence will have the added advantage of reduction in the production of ambiguous data due to variations in friction angles as the stylus tip slips around the surface of the calibration sphere. The sequence could comprise, for example, a six-turn spiral followed by a similar spiral in the reverse direction, i.e., similar to a double helix.

The coordinate measuring machine controller collects data from both the probe and the coordinate measuring machine during the sequence (i.e., the abc signals and the XYZ signals). The uncalibrated data thus collected is used to calculate the necessary calibration coefficients using known mathematical methods (for example least squares iteration).

The method of moving the probe in chordal movements around the calibration sphere allows the probe stylus to be exercised sufficiently to produce a suitably distributed and adequate amount of uncalibrated abc data. This spread of probe output data from all probe axes allows good calculation of the calibration coefficients to be made which leads to better system accuracy.

The invention is not restricted to moving the probe in chordal movements around the calibration sphere. The probe may be moved around the calibration artifact along any path which results in variation of the stylus deflection. The probe could, for example, also be driven around the calibration sphere in a curved path, the shape of the curved path chosen to allow a large range of stylus deflections and distribution of data to be collected. However driving the probe in a straight line, i.e., chords, has the advantage of shorter calibration routines.

The chordal sequence of moves is easy to program and to set up. It uses commonly available calibration spheres and thus no special apparatus is required. In addition, this calibration sequence is faster than other known data collection methods.

Figure 4:
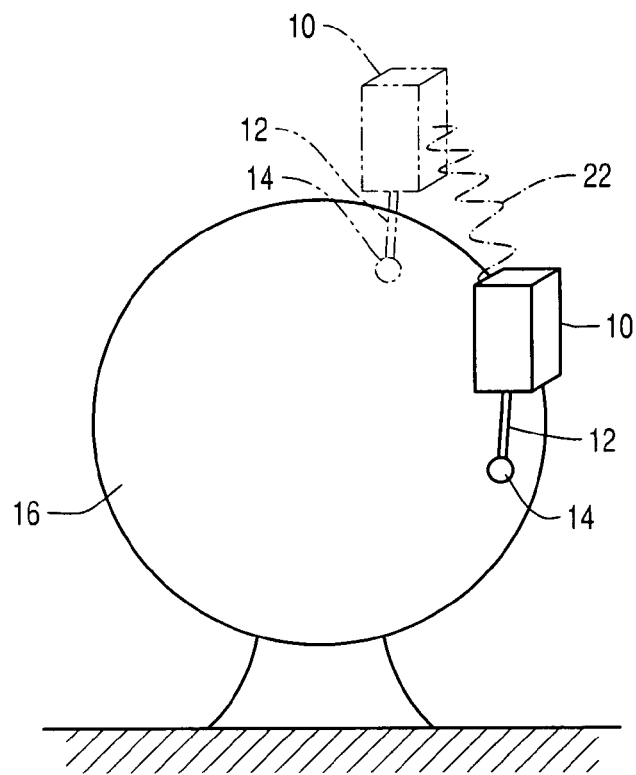
FIG. 4 illustrates the probe following a sinusoidal path around a calibration sphere.

FIG. 4 illustrates the probe 10 being driven around the calibration sphere 16 in a sinusoidal path 22. The sinusoidal probe path 22 causes the distance between the probe 10 and the center of the calibration sphere 16 to vary, thus causing variation in the deflection of the stylus. The sinusoidal probe path has the advantage that it is a smooth path for movement of the quill of the machine.

Figure 5:
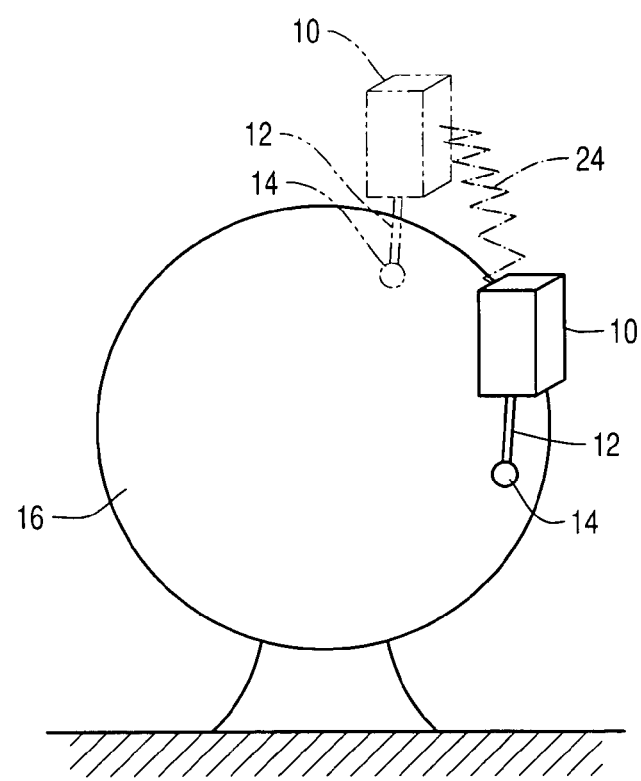
FIG. 5 illustrates the probe following a saw tooth path around a calibration sphere.

FIG. 5 illustrates the probe 10 being driven around the calibration sphere 16 in a saw tooth shaped path 24. As before, this saw tooth path 24 causes the distance between the probe 10 and center of the calibration sphere 16 to vary, thus causing variation in the stylus deflection.

The calibration artifact may comprise a calibration sphere or any other shape. However, in practice it is convenient to use a calibration sphere as these are commonly available.

The invention is also suitable for use with non-contact probes, such as optical, inductance or capacitance probes. Non-contact probes, as with contact probes, are used within a working range between lower and upper extremities of its probe outputs. The probe outputs represent distance of the probe from a surface and the non-contact probe is thus used within a range of distances from the surface. It is within this range that it must be calibrated.

Figure 6:
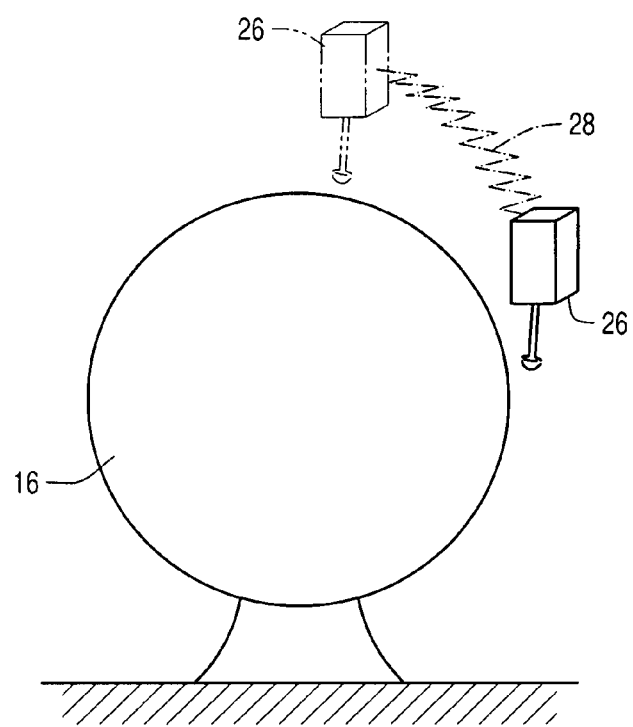
FIG. 6 illustrates a non-contact probe following a known path around a calibration sphere.

As illustrated in FIG. 6, the non-contact probe 26 is moved along a known path 28 around the calibration artifact 16, such that there is a variation in the distance between the probe 26 and the calibration artifact 16. This path may comprise, for example, a sequence of linear movements along which the distance from the calibration artefact varies. Alternatively the path may be a curved path, such as the sinusoidal path described above.

As the non-contact probe is moved along the path, position data from the CMM and measurement data from the non-contact probe are combined to determine the measured dimensions of the calibrated artifact. These are compared with the known dimensions of the artifact and are used to calculate the calibration coefficients of the probe.

In a further embodiment of the invention, a surface scan path on the calibration artifact is scanned two or more times at different radial readings of the probe within its working range.

Figure 9:
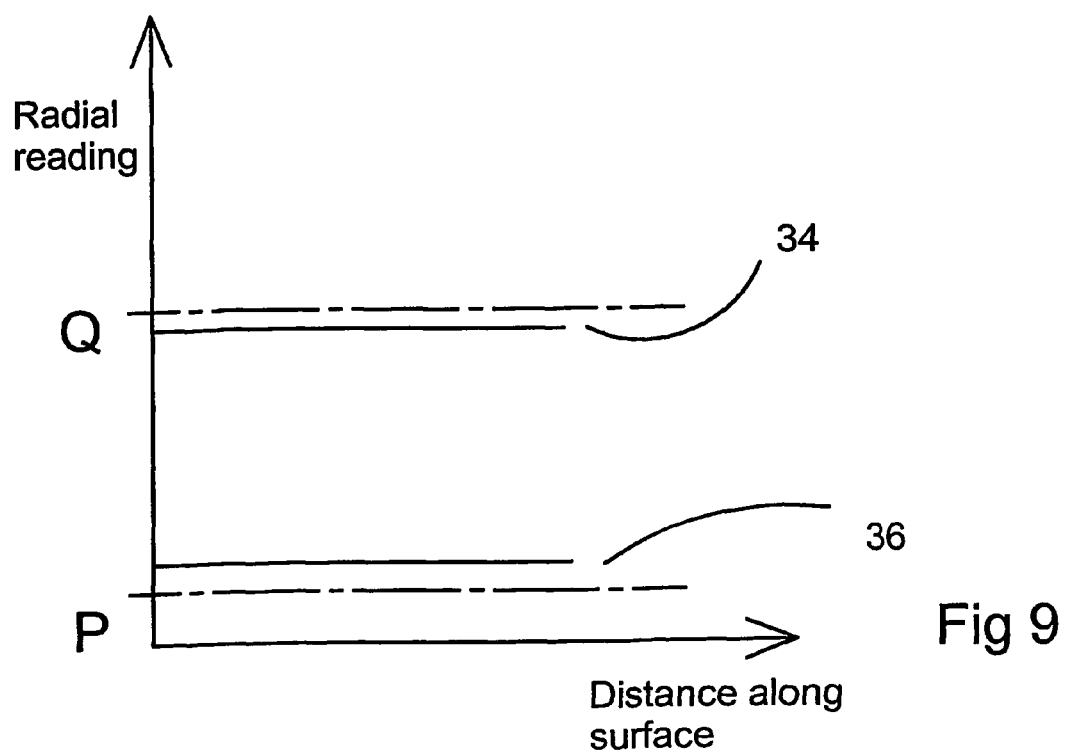
FIG. 9 illustrates the relationship between the radial output of the probe and the distance travelled along the scan path.

For example, a surface path on the calibration artifact may be scanned with a contact probe a first time at a first stylus deflection towards the upper limit of the probe's radial working range and a second time at a second stylus deflection towards the lower limit of the probe's radial working range. FIG. 9 illustrates the relationship between the radial deflection of the probe and distance travelled along the scan path. The working range lies between lines P and Q. The radial deflection for the first stylus deflection is shown at 34 and the radial deflection for the second stylus deflection is shown at 36.

A scan path on the calibration artifact may be scanned for more than two different stylus deflections. For example it could be scanned a third time with the stylus deflection such that the radial deflection is towards the middle of the working range.

The same method applies for a non-contact probe. In this case the scan path on the calibration artifact is scanned two or more times at different radial distances from the artefact.

The term "working range" includes both the maximum possible working range of a probe and a sub-range within it which may be used for any particular application.

The invention claimed is:

1. A method of calibrating a probe having a stylus comprising the steps of:
   mounting a calibration artifact on a first part of a coordinate positioning machine;
   mounting the probe on a second part of the coordinate positioning machine, said second part being movable with respect to said first part;
   moving the probe relative to the calibration artifact along one or more scan paths around the calibration artifact thus deflecting the stylus while continuously scanning the surface of the calibration artifact such that the probe is exercised through its working range;
   obtaining measurement data based on a deflection of the stylus and a position of said second part relative to said first part; and
   using the measurement data to determine the calibration coefficients of the probe.

2. A method of calibrating a probe according to claim 1 wherein the calibration artifact comprises a sphere and at least part of the path of the probe is parallel to a chord of the sphere.

3. A method of calibrating a probe according to claim 1 wherein the path of the probe comprises a sequence of lines parallel to chords of the sphere.

4. A method of calibrating a probe according to claim 1, wherein the path of the probe comprises a sinusoidal path.

5. A method of calibrating a probe according to claim 1 wherein the direction of the path of the probe is reversed.

6. A method of calibrating a probe according to claim 1 wherein the probe is an analogue probe having a stylus with a workpiece-contacting tip and wherein the path of the probe is such that the amount of deflection of the stylus varies along the path.

7. A method of calibrating a probe according to claim 2 wherein at least one scan path is scanned at two or more different stylus deflections.

* * * * *